July 25, 1967     F. BÜRKLE     3,332,592
EXTENSIBLE LINK BRACELET
Original Filed Aug. 2, 1962     3 Sheets-Sheet 1
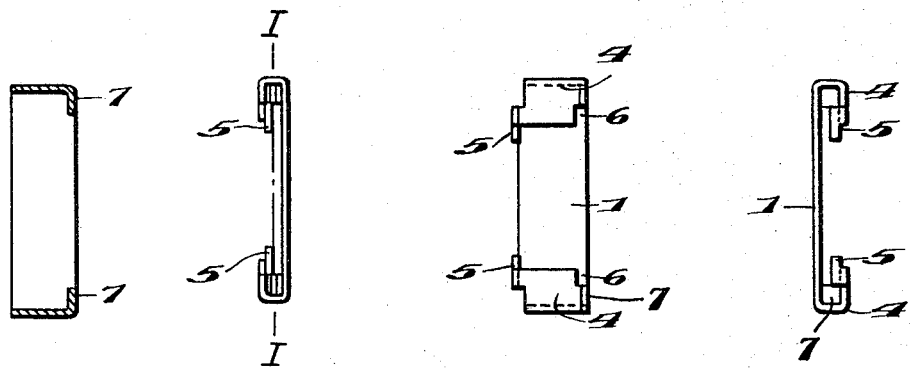
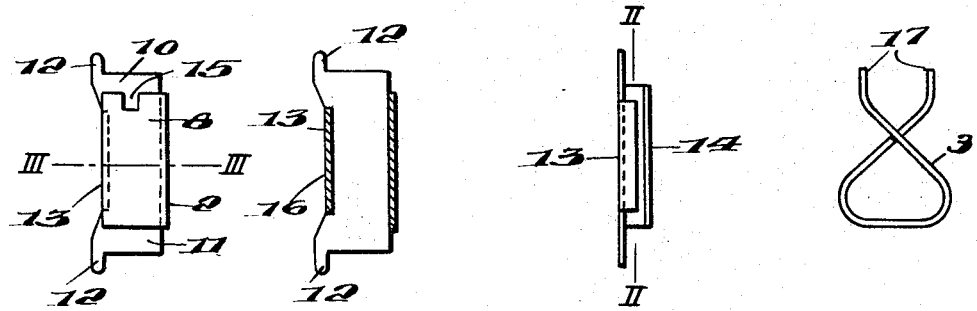
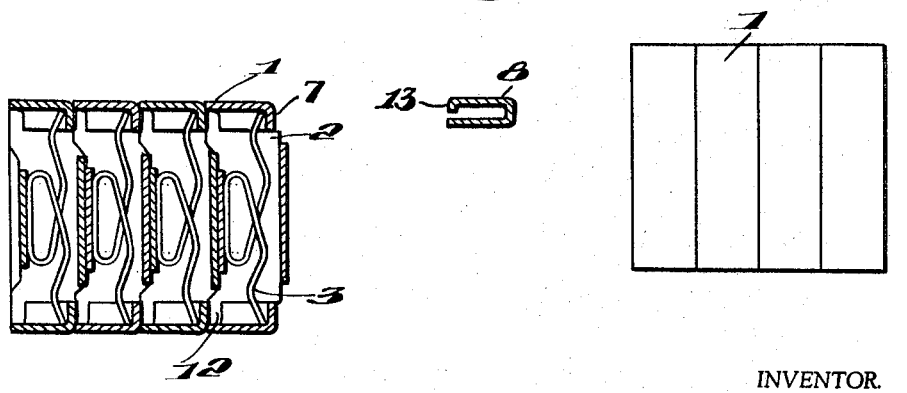
INVENTOR.
FRITZ BÜRKLE
BY Bailey, Stephens & Huettig
ATTORNEYS

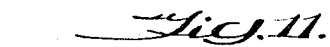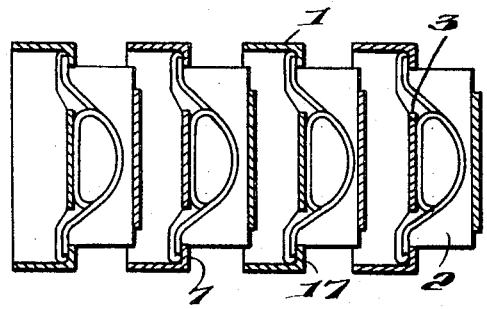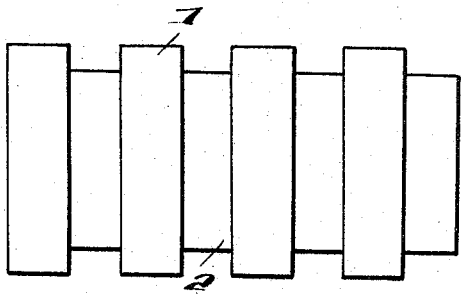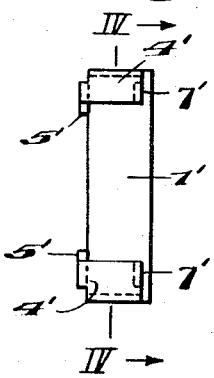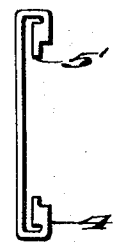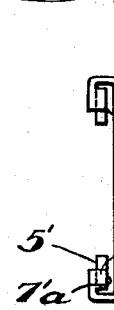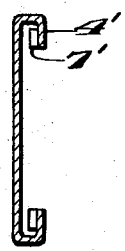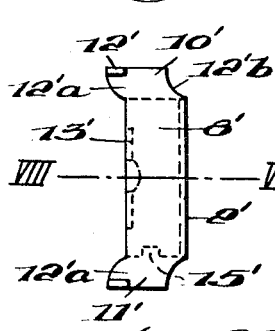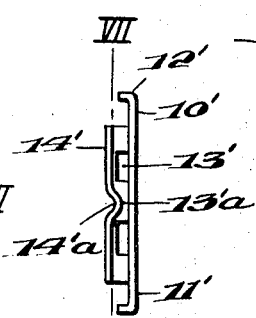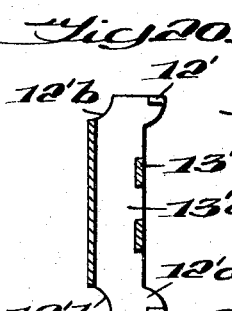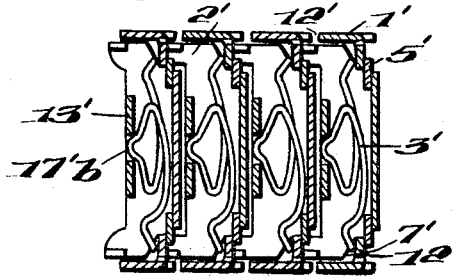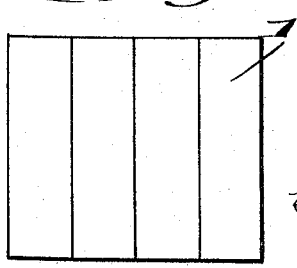
INVENTOR.
FRITZ BÜRKLE
ATTORNEYS INVENTOR.
FRITZ BÜRKLE
BY Bailey, Stephens & Huettig
ATTORNEYS

United States Patent Office 3,332,592
Patented July 25, 1967

3,332,592
EXTENSIBLE LINK BRACELET
Fritz Bürkle, Schwann, near Pforzheim, Germany
Continuation of application Ser. No. 214,402, Aug. 2, 1962. This application June 4, 1965, Ser. No. 467,172
Claims priority, application Germany, Aug. 8, 1961, B 63,566; Dec. 23, 1961, B 65,334
21 Claims. (Cl. 224—4)

This application is a continuation of my application S.N. 214,402, filed Aug. 2, 1962, now abandoned.

The present invention relates to an extensible link bracelet of a very small thickness for ornamental and utilitarian purposes which consists of a plurality of link units, each of which comprises a frame member and a sleeve-like connection member which are telescopically slidable against spring action into each other and in which the individual members are connected to each other at one side by means of tabs on one connecting member which pivotably engage under the bent-over ends of the adjacent frame member and at the other side by means of a spring or springs which are provided in each sleeve-like connecting member. Such extensible link bracelets are used very frequently as watch straps. The known kinds of bracelets of this type have the disadvantage that the length to which the bracelet may be extended is limited by the spring or springs which are mounted in the sleevelike connecting member of each link unit since, when the bracelet is extended, the compressed spring is clamped between the frame member and the connecting member so that the height of the compressed spring determines and limits the extent which the two members may be telescoped into each other. This fact is of a minor importance as long as the individual links of the bracelet have a certain minimum size or the bracelet is provided with a sufficiently number of links. It leads, however, to considerable difficulties when such a bracelet is to be used, for example, as a watch strap and when for esthetic reasons the individual link units should be relatively small and the number of links accordingly increased. The need for increasing the number of links occurs particularly when the thickness of the bracelet is to be reduced so that its appearance will be in conformity with that of a modern flat wrist watch. The bracelets according to the known designs cannot, however, be made as thin as desired for this purpose since the coil springs which are mounted within the sleevelike connecting members and act upon the frame members of these bracelets have to have a certain minimum thickness which in turn requires the connecting and frame members also to be made of a certain minimum thickness. Furthermore, it would then be impossible to provide the large number of links which is required in a thin bracelet for esthetic reasons because the distance to which the members of each link can be extended and thus the length of the entire extended bracelet would be much too small to permit such a bracelet to be used as a watch strap.

It is an object of the present invention to provide an extensible link bracelet which can be extended to a very great length and may be made so thin that it is especially suitable for use as a strap for a modern thin wrist watch.

According to the invention, this object is attained by providing each link unit of the bracelet of a connecting member and a frame member which has a sleevelike part, and by pivotally connecting this connecting member at one side of the sleeve part to a frame member by means of a pair of tabs on the frame which extend into the sleeve, and by providing each connecting member at the other side of its sleeve part with a pair of projections which extend coaxially opposite to each other transversely of the bracelet and are offset for a certain distance relative to the side wall of the sleeve. When the bracelet is being extended, these projections on the connecting member are slidable underneath the bent-over ends of the frame member of the adjacent link unit against the action of a spring which is mounted within the sleeve until they engage upon a pair of stop lugs on the frame member which limit the distance to which the two members of each link unit of the bracelet may be drawn apart and thus limit the length to which the bracelet may be extended.

The outward projections on each connecting member are preferably offset relative to the side wall of the sleeve part in the longitudinal direction of the bracelet toward the adjacent link unit for a distance which is substantially equal to the thickness of the material of the connecting member. Another feature of the invention is to provide the spring which is mounted within the sleeve part of the connecting member in the form of a crossed-over torsion spring, the two ends of which project from the opposite ends of the sleeve part and engage underneath the bent-over ends of the frame member of the adjacent link unit and against the stop lugs which limit the extent to which the bracelet may be drawn out. By designing and mounting the torsion spring so that its ends engage upon the stop lugs of the frame member at such a level above the outward projections of the connecting member that these outward projections will engage directly upon the stop lugs, the advantage is attained that, when the bracelet is being extended, the limit of its extension is not determined by the springs but by the outward projections on the connecting members and their direct engagement with the stop lugs without any intermediate spring parts. Consequently, the members of each link and thus the entire bracelet can be extended for a very great distance and without any danger that any of the springs might then be overloaded or become wedged. The distance to which the bracelet may be extended is further increased by offsetting the outward projections on the connecting members in the longitudinal direction of the bracelet relative to the associated sleeve parts of the various link units in the manner as previously described. For the same purpose it is also advisable, especially when the stop lugs for limiting the length to which the bracelet may be extended are formed by tabs on the bent-over ends of the frame member, to provide these bent-over ends at the side opposite to the lugs with recesses into which the stop lugs of the adjacent frame member may engage when the bracelet is fully contracted so that the various adjacent frame members will then directly and fully engage with each other and present a closed appearance even on the rear side of the bracelet.

According to another embodiment of the invention, the projections on the connecting member—instead of projecting outwardly as in the first embodiment—may be bent inwardly at substantially right angles relative to the side walls of the sleeve part. When the bracelet is extended, the narrow sides of these inwardly extending projections facing in the longitudinal direction of the bracelet will engage with the stop lugs on the associated frame members which limit the extensibility of the bracelet. By designing the projections in this manner, it is, in turn, possible to design the springs which are mounted in the sleeve parts of the connecting members so that the ends of these springs terminate in the assembled bracelet underneath the projections of the associated connecting members, as seen in the transverse direction of the bracelet, and these spring ends will thus not interfere with the sliding movements of the connecting members. This further improves the easy expansion and contraction of the bracelet and reduces its susceptibility to trouble. If in such a bracelet one side wall of each connecting member is extended at both sides beyond the sleeve part thereof, the ends of these extensions which carry the mentioned projections may also be inserted into narrow slots extending in the longitudinal direction of the bracelet between the front wall of each frame member and the bent-over ends thereof. The outer ends of these extensions on the connecting members which carry the projections may then slidably engage on the inside of the side wall portions of the frame members between the bent-over ends and the front wall thereof. This has the advantage that the bracelet has also in the extended position a very pleasing appearance since the parts of the connecting members which are visible at the outside of the bracelet will then be almost flush with the front surfaces and lateral edges of the frame members.

Since the extensibility of the bracelet is limited by the engagement of the inner narrow side of the inwardly bent projections with the stop lugs on the frame members, the bracelet also possesses such a great stability that it is practically impossible that the projections, since they are subjected to stresses merely in their longitudinal direction, might break off when an excessive tension is exerted upon the fully extended bracelet.

The aforementioned as well as further objects, features, and advantages of the present invention will become more clearly apparent from the following detailed description thereof, which is to be read with reference to the accompanying drawings, in which:

FIGURE 1 shows a plan view of a frame member of a link bracelet according to the invention;

FIGURE 2 shows a side view of the frame member according to FIGURE 1;

FIGURE 3 shows a side view of the frame member according to FIGURE 1, but as seen from the opposite side as in FIGURE 2;

FIGURE 4 shows a cross section taken along line I—I of FIGURE 3;

FIGURE 5 shows a plan view of a connecting member of the link bracelet according to the invention;

FIGURE 6 shows a side view of the connecting member according to FIGURE 5;

FIGURE 7 shows a cross section taken along line II—II of FIGURE 6;

FIGURE 8 shows a cross section taken along line III—III of FGURE 5;

FIGURE 9 shows a plan view of a spring of the link bracelet according to the invention in the released position;

FIGURE 10 shows a front view of a number of link units of the bracelet according to the invention in the released position and with the link parts being shown in a cross section taken along line I—I of FIGURE 3 and line II—II of FIGURE 6;

FIGURE 11 shows a cross section similar to FIGURE 10, but with the link units in the extended position;

FIGURE 12 shows a front view of the links units according to FIGURE 10 in the released position;

FIGURE 13 shows a front view of the link units according to FIGURE 10 in the extended position;

FIG. 14 shows a plan view of a frame member of a modified form of bracelet;

FIGS. 15 and 16 show side views of the frame member of FIG. 14 from the right and left respectively;

FIG. 17 is a cross-section on the line IV—IV of FIG. 14;

FIG. 18 shows a plan view of a connecting member of the modified bracelet;

FIG. 19 shows a side view of the connecting member of FIG. 18;

FIG. 20 shows a cross-section along the line VII—VII of FIG. 19;

FIG. 20A shows a cross-section on the line VIII—VIII of FIG. 18;

Figure 24:
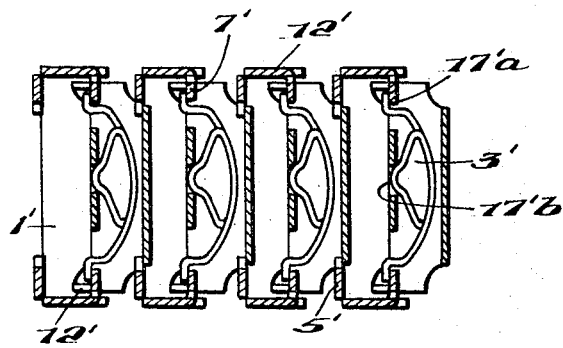
Figure 25:
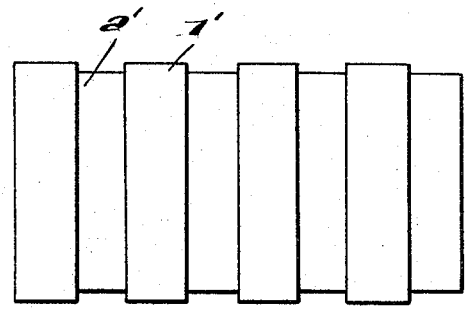
Figure 26:
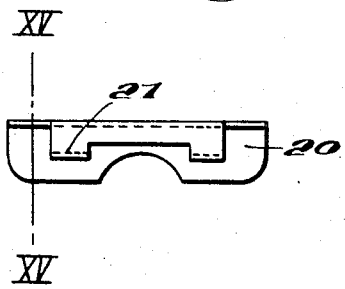
Figure 27:
Figure 28:
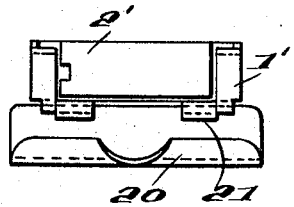
Figure 29:
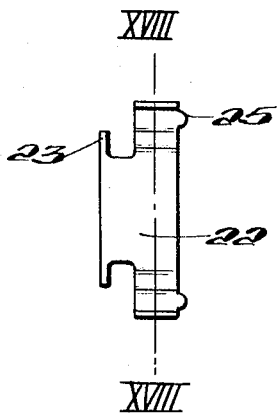
Figure 30:
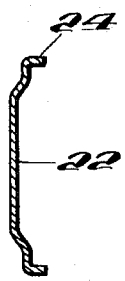
Figure 31:
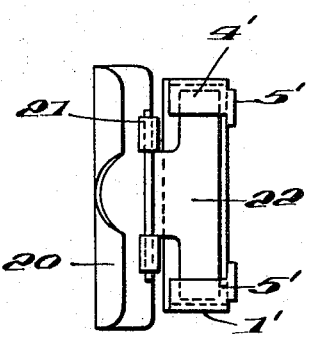

FIG. 21 a plan view of a spring of the modified bracelet in the released position;

FIG. 22 shows the modified bracelet formed of the parts in FIGS. 14 to 21 in longitudinal cross-section;

FIG. 23 shows the modified bracelet in side elevation;

FIGS. 24 and 25 are views similar to FIGS. 22 and 23 with the bracelet expanded;

FIGURE 26 shows a side view of an end connecting link of the bracelet according to FIGURES 14 to 25;

FIGURE 27 shows a cross section taken along line XV—XV of FIGURE 26;

FIGURE 28 shows a plan view of the end connecting link according to FIGURE 26 connected to a frame member;

FIGURE 29 shows a plan view of an intermediate connecting member for the last frame member on one end of the bracelet according to FIGURES 14 to 25;

FIGURE 30 shows a cross section taken along line XVIII—XVIII of FIGURE 29; while FIGURE 31 shows a plan view of the intermediate connecting member according to FIGURE 29 connected to an end connecting member according to FIGURE 26 and to a frame member.

Referring to the drawings, and first particularly to FIGURES 1 to 13, the extensible link bracelet according to the invention consists of a plurality of link units each of which comprises a frame member 1 and a connecting member 2 which are telescopically slidable into each other against the action of a spring 3. As shown particularly in FIGURES 1 and 2, the lateral ends of each frame member 1 are bent over so as to be U-shaped and the free ends 4 thereof are provided at one side of the frame member with two opposite tabs 5 facing each other which are laterally offset relative to the edge of the frame member so as to project beyond this edge for a distance equal to the thickness of the material. At the side of the frame member opposite to the tabs 5, each bent-over end 4 is provided with a recess 6 for receiving the corresponding tab 5 of the adjacent frame member 1 when the bracelet is in the contracted position, as shown in FIGURE 10. At one end, the ends 4 are provided with bent-over lugs 7 which, as subsequently described in detail, serve as stops for limiting the length to which the bracelet may be extended.

Each connecting member 2, as shown in FIGURES 5 to 8, consists of a flat sleeve 8 of a substantially rectangular cross section, one side wall of which has a greater length than the other and projects at both sides 10 and 11 beyond the remainder of the sleeve. Each of these projecting portions 10 and 11 is stamped out to form at one side of the sleeve a projection 12 which is offset relative to the side wall 13 of sleeve 8 in the direction toward the adjacent link unit so as to project beyond this side wall for a distance equal to the thickness of the material. The other shorter side wall 14 of sleeve 8 is provided with a recess 15 through which the tab 5 on the corresponding side of the frame member 1 of the adjacent link unit may be inserted. By laterally offsetting the outward projections 12 relative to the side wall 13 of the sleeve 8, an intermediate recess 16 is formed which when the bracelet is contracted, permits the sleeves 8 of adjacent connecting members to abut directly against each other without any intermediate gap, as may be seen in FIGURE 10.

Each sleeve 8 contains a crossed torsion spring 3 which is inserted in the manner as shown in FIGURE 10 so that its two ends 17 project at both sides from the sleeve. When the bracelet is assembled, spring 3 which usually consists of spring wire is placed in such a position, as illustrated in FIGURE 11, that its ends 17 lie on the lugs 7 of the frame member 1 at such a level above the projections 12 of the associated connecting member 2 that the projections 12 engage directly upon the lugs 7.

When the bracelet is being assembled, spring 3 is first inserted in the manner as shown in FIGURE 10 into sleeve 8 of a connecting member 2 which has been hooked together with a frame member 1. If the connecting member 2 in frame member 1 is then shifted laterally, the ends 17 of spring 3 will snap under the bent-over ends 4 of frame member 1, where they engage upon lugs 7. This complete link unit of the bracelet may then be connected in a simple manner to similar link units by inserting the tabs 5 of the frame member 1 of the next unit through the recess 15 into sleeve 8 so that these tabs 5 will then engage like hinge pins in sleeve 8.

On its outer side, the bracelet appears completely flat and smooth and without any projecting parts, and it is extensible to a very great length, as may be seen by a comparison of FIGURES 12 and 13. This length is limited by the projections 12 which, when the bracelet is fully expanded, engage upon the lugs 7 which serve as stops and prevent the springs 3 from being overloaded.

Each part 14 of the sleeves or connecting members is of substantially the same length as the gap between the inner ends of the bent-over portions 4 of the link or connecting member 1 and is aligned with this gap longitudinally of the bracelet, so that parts 14 enter and fill the gaps when the bracelet is contracted and the inside of bracelet is smooth, and will not chafe the wrist of the wearer.

In the modification of the link bracelet according to the invention, as illustrated in FIGURES 14 to 27, the ends of the wall portions 10' and 11' of sleeve 8' as shown in FIGURES 18 and 20 which project beyond the sleeve itself have substantially straight edges although they may also possibly be slightly inclined toward each other from the side carrying the projections 12'. These projections on the upper longer side wall of the sleeve at one side of the projecting portions 10' and 11' are in this case bent inwardly substantially at a right angle, as clearly shown in FIGURES 18 to 20, and they are provided on projecting parts 12'a which are adapted to engage into corresponding recesses 12'b at the opposite side of the wall portions 10' and 11' of the adjacent sleeve 8' when the bracelet is in the contracted position. The projections 12' are also offset relative to the side wall 13' of sleeve 8' similarly as described with reference to FIGURES 5 to 8.

The end portions of the crossed torsion spring 3' are bent at an angle toward one side at 17' and back again at a substantially right angle at 17'a to a hooklike shape. The central part of spring 3' is bent to have a noselike projection 17' which is provided for holding the spring in sleeve 8' in a fixed central position so as to prevent the spring ends 17'b from interfering with the projections 12' of the connecting members 2'. Side wall 13' of sleeve 8' is for this purpose provided with an aperture 13'a into which the noselike projection 17'b of the spring 3' engages. At a central point 14'a the upper side wall 14' of sleeve 8' is bent slightly into the aperture 13'a, as clearly shown in FIGURE 19, and partly into the eye which is formed by the projection 17'b of the spring so as to lock the latter in a fixed position within aperture 13'a.

In the assembled bracelet, as shown in FIGURES 22 and 24, spring 3' are inserted under tension between the lugs 7' of the frame members 1'. By being bent at 17'a at substantially right angles the spring ends 17' are prevented from engaging with the projections 12' and they insure that the spring ends will always remain underneath these projections 12' and will not interfere with their sliding movements. The length to which the bracelets may be extended is limited by the engagement of the inner narrow sides of the upwardly bent projections 12' on the bent-over lugs 7' of the frame members 1'. Since the projections 12' are very resistant against being overloaded in their longitudinal direction, for example, when the bracelet is fully extended, it is practically impossible for them to become wedged, bent, or to be torn out.

The provision of the bent-over projections 12' permits the connecting members to be designed in the manner as illustrated in FIGURES 18 to 20, so that the parts 10' and 11' of their longer side walls extend to a point directly underneath the upper and lower side walls of the bent-over ends 4' of the frame members 1', as shown in FIGURES 22 and 24. This has the result that the difference between the height of the connecting members 2' and the frame members 1' is very small and that therefore when this bracelet is extended its appearance is still more uniform than the bracelet according to the first embodiment of the invention, as may be seen by a comparison of the enlarged views as shown in FIGURES 13 and 25.

In order to permit the wall portions 10' and 11' of the connecting member 2' to pass into and out of the frame member 1', the bent-over ends 4' of the frame member are provided with a slotlike opening 4'a, while the edge 7'a of lugs 7' terminates at a distance from the opposite side wall of the frame member which is at least equal to the thickness of the material, as shown particularly in FIGURES 16 and 17.

When used as a watch bracelet, the bracelet according to the invention may be attached to the connecting rods of a wrist watch in the usual manner by means of end links 20, as illustrated particularly in FIGURE 26, which— if desired—may be firmly secured to the connecting rods of the watch by being bent around the same. Although these parts are known as such, they have to be particularly designed for the present watch bracelet so as to permit them to be connected to the frame members 1' of the bracelet. For this purpose, the end links 20 are provided with stamped-out connecting tabs 21. These connecting tabs 21 of one end link 20 are hooked into the tabs 5' of the last frame member 1' at one end of the bracelet in the manner as illustrated in FIGURE 28, and if desired they may be clamped together with these tabs. At the other end of the bracelet, the last frame member 1' is secured by means of its tabs 5' to the second-last connecting member so that only the bent-over lugs 7' face forwardly. For connecting the other end link 20 to this end of the bracelet, the rear end of an intermediate member 22, as shown in FIGURE 29, is inserted into the last frame member 1' and clamped under the bent-over ends 4' thereof. On its front side, this intermediate member 22 has pivot-pinlike projections 23, the outer ends of which may, if desired, be bent over at a right angle toward the body of member 22. The connecting tabs 21 of the end link 20 may then be hooked over and clamped upon these projections 23 in the manner as shown in FIGURE 31. The two ends 24 of the part of member 22 which is to be inserted under the arms 4' of the last frame member 1' are bent over approximately at a right angle, as shown in FIGURE 30, while the rear edge of member 22 is provided with a pair of projections 25 which, when member 22 is inserted, engage upon the tabs 5' of the last frame member 1' and thereby hold the member 22 in a rigid position in the frame member, whereas the last connecting member 2' which is hooked to the tabs 5' is freely movable.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A very thin extensible link bracelet for ornamental and utilitarian purposes comprising a plurality of adjacent link units, each comprising a frame member and a connecting member telescopically slidable into each other, said frame member having a main substantially flat portion with ends bent at right angles to the main portion and tabs carried by said ends and bent towards each other to a plane parallel to the plane of the main portion, the free end edges of said tabs being spaced apart by a substantial distance, and a pair of stop lugs, said connecting member comprising a sleevelike part, said frame member having a pair of tabs thereon extending into said sleevelike part pivotally connecting said members, a pair of projections on the outside of one side wall of said connecting member extending coaxially opposite to each other transversely of the bracelet and being offset relative to the corresponding side wall of said sleevelike part, a spring mounted in said sleevelike part, said projections being slidable underneath said bent-over ends of another frame member against the action of said spring when the bracelet is being extended until each projection engages upon a part of one of said stop lugs on said frame member for limiting the distance to which the bracelet may be extended, said spring having a central part engaging the side wall of the sleevelike part on the outside of which said projections are located and having end portions each engaging a part of one of said stop lugs out of the path of travel of said projections, said sleevelike part having a wall portion on the side opposite the main portion of the frame member of a length substantially equal to, and located in alignment with, the space between the free end edges of said tabs.

2. A link bracelet as defined in claim 1, in which said projections on each connecting member are offset relative to the adjacent side wall of said sleevelike part in the direction toward the adjacent link unit by a distance substantially equal to the thickness of the material of said connecting member.

3. A link bracelet as defined in claim 2, in which each connecting member consists of a sleeevelike part of a substantially rectangular cross section and has one longer side wall extending at both sides beyond said sleevelike part and carrying said projections on its ends.

4. A link bracelet as defined in claim 1, in which said sleevelike part of each connecting member has a recess in one side wall thereof permitting one of said tabs on the frame member to be passed therethrough when the adjacent link units are being connected to each other.

5. A link bracelet as defined in claim 1, in which said tabs extending into the sleevelike part of the adjacent connecting member are provided at one side of said bent-over ends of each frame member and are offset relative to the lateral edge of said frame member by a distance substantially equal to the thickness of the material of said frame member.

6. A link bracelet as defined in claim 5, in which each of the bent-over ends of each frame member has a recess in the side opposite to said tabs for receiving the respective offset tab of the adjacent frame member.

7. A link bracelet as defined in claim 1, in which said stop lugs have stop portions for limiting the extensibility of the bracelet, said spring mounted in said sleeve part of each connecting member having a bent torsion spring, the two ends of said spring projecting at both sides from said sleeve part and engaging under said bent-over ends of the adjacent frame member and upon said stop portions on the latter when said bracelet is fully extended.

8. A link bracelet as defined in claim 7, in which the ends of said torsion spring engage parts of said stop lugs displaced in a direction transverse to the central plane of the bracelet with respect to the parts engaged by said projections.

9. A link bracelet as defined in claim 7, in which said stop lugs are formed by bent-over lugs on the inside of said bent-over ends of each frame member.

10. A link bracelet as defined in claim 7, in which said projections on each connecting member are bent inwardly substantially at right angles relative to said side wall carrying the same so that, when the bracelet is extended, said projections including a narrow side facing in the longitudinal direction of the bracelet, said narrow sides engage upon said stop portions on the associated frame member.

11. A link bracelet as defined in claim 10, in which each connecting member has one longer side wall projecting at both sides beyond said sleevelike part thereof, the ends of said longer side wall carrying said projections at one side thereof, said longer side wall extending to a point underneath each bent-over end of the associated frame member and through a narrow slot formed in the longitudinal direction between the wall and the bent-over end of said frame member.

12. A link bracelet as defined in claim 11, in which said longer side wall of each connecting member has recesses at the side thereof opposite to said projections for receiving said projections of the adjacent connecting member.

13. A link bracelet as defined in claim 10, in which said stop portions on each frame member consist of inwardly bent lugs on said bent-over ends of said frame member, said lugs having inner edges spaced from the wall of said frame member by a distance at least equal to the thickness of the material of said frame member.

14. A link bracelet as defined in claim 10, in which the ends of said torsion spring are hook-shaped with a part of each end being bent at a substantially right angle.

15. A link bracelet as defined in claim 14, in which, when the bracelet is assembled, the ends of each spring terminate closer to the center line of the bracelet than said projections.

16. A link bracelet as defined in claim 10, in which said sleevelike part of each connecting member is produced by bending and provided in one narrow side wall thereof with an aperture into which a corresponding part of the adjacent wider side wall is bent.

17. A link bracelet as defined in claim 10, in which said sleeve part of each connecting member is provided in one narrow side wall thereof with an aperture, said torsion spring in said sleevelike part having a noselike projection engaging into said aperture so as to be prevented from sliding laterally in said sleeve part.

18. A link bracelet as defined in claim 17, in which one wider side wall of said sleevelike part adjacent to said narrow side wall has a bent portion engaging into said aperture and into the eye formed by said noselike projection of said spring.

19. A link bracelet as defined in claim 1, further comprising end links, each having a hook-shaped part adapted to be connected to one of the connecting bars of a wrist watch and having stamped-out connecting tabs adapted to be connected to and to enclose the tabs on the adjacent last frame member of said bracelet.

20. A link bracelet as defined in claim 1, further comprising end links each having a hook-shaped part adapted to be connected to one of the connecting bars of a wrist watch and having stamped-out connecting tabs, an intermediate member inserted from one side underneath and clamped to said bent-over ends of the adjacent last frame member of said bracelet and having a pair of projections on the other side extending parallel to the axis of said intermediate member, said connecting tabs on said end link connected to and enclosing said projections on said intermediate member.

21. A link bracelet as defined in claim 20, in which said intermediate member is provided on one side with projections engaging at the inside of said last frame member against the tabs thereof.

References Cited

UNITED STATES PATENTS 2,826,900   3/1958   Augenstein _____ 59—79.5

FOREIGN PATENTS 1,060,636   7/1959   Germany.

CHARLES W. LANHAM, *Primary Examiner.*

G. P. CROSBY, *Assistant Examiner.*